Jan. 2, 1951 S. RUBEN 2,536,699
ALKALINE DRY CELL
Filed June 6, 1947

INVENTOR.
Samuel Ruben
BY
Nicholas Langer
ATTORNEY

Patented Jan. 2, 1951

2,536,699

UNITED STATES PATENT OFFICE 2,536,699

ALKALINE DRY CELL

Samuel Ruben, New Rochelle, N. Y.

Application June 6, 1947, Serial No. 752,857

14 Claims. (Cl. 136—107)

This invention relates to alkaline dry cells.

The present application is a continuation-in-part of prior-filed copending applications S. N. 468,386, filed December 9, 1942, now Patent No. 2,463,565 granted March 8, 1949, for Dry Primary Cell; S. N. 473,320, filed January 23, 1943, now Patent No. 2,473,546 granted June 21, 1949, for Alkaline Primary Cell; S. N. 486,367, filed May 10, 1943, now Patent No. 2,481,539 granted September 13, 1949, for Method of Making Depolarizer Units for Alkaline Primary Cells; and S. N. 604,269, filed July 10, 1945, now Patent No. 2,422,045, granted June 10, 1947, for Alkaline Dry Cell.

An object of the invention is to improve alkaline dry cells.

Another object is to improve the electrolyte therefor.

A further object is to provide an alkaline dry cell with a solid electrolyte.

Other objects will be apparent from the following description and claims.

Heretofore alkaline primary cells have been produced having amalgamated zinc anodes, oxide cathodes and electrolytes formed of liquid aqueous solutions of sodium or potassium hydroxide. These have generally been characterized by relatively widely spaced electrodes and a large electrolyte bath. They could not be sealed and have required careful handling in order to prevent spillage of electrolyte.

These prior cells have generally been suitable for closed-circuit applications only and have had several serious disadvantages. They were subject to continual chemical attack on the zinc anode by the electrolyte with consequent gas generation. This attack was greatly accelerated at elevated temperatures. The cathode materials, such as dissolved copper compounds, migrated to the anode, particularly if the cells were left standing on open circuit. These cathode products, on reaching the anode, set up local couples, thereby greatly accelerating the destructive attack on the anode.

In my copending application Serial No. 468,386, now Patent No. 2,463,565, I have disclosed and claimed a method of making a dry cell, including a spacer-electrolyte member which comprises heating a concentrated alkali metal hydroxide solution, which is normally solid at 25° C., to a temperature at which said solution is fluid and then immersing and holding a spacer member in said solution until said member becomes impregnated with the solution.

In my copending application Serial No. 473,320, now Patent No. 2,473,546, I have disclosed and claimed a primary cell comprising a sheet zinc electrode, an alkali metal hydroxide electrolyte, and a sheet depolarizing electrode spaced from the first electrode including a conductive base of ferrous metal and a coating bonded thereto essentially constituted by a mixture of mercuric oxide with a smaller amount of finely divided inert material of higher conductivity.

In my copending application Serial No. 486,367, now Patent No. 2,481,539, I have disclosed and claimed an improved cathode-depolarizer terminal assembly and a method of making the same. The said terminal assembly comprises a metal cup having a pellet composed of a finely divided electrolytically dissociable oxygen-yielding compound and of a similarly divided inert material of higher conductivity, said compressed pellet being consolidated into a coherent cathode-depolarizer body accurately conforming to the inner surface of the cup in contact therewith, and forming with such surface an integral and permanent bond of low electrical resistance.

In my aforementioned copending application Serial No. 604,269, now Patent No. 2,422,045, there is described and claimed a sealed alkaline dry cell wherein the electrolyte is given a substantial content of alkali metal zincate to reduce the open-circuit chemical attack on the amalgamated zinc anode to a negligible value and is immobilized to prevent circulation. In most of the forms of the invention described in that application a barrier means is provided in the electrolyte path substantially to prevent migration of deleterious cathode products from the cathode.

The present invention contemplates a primary cell wherein the electrolyte is a solid immobile alkali metal hydroxide composition containing water of hydration. The electrolyte itself comprises a barrier against migration of cathode products.

The preferred solid electrolyte comprises potassium hydroxide containing water of hydration together with potassium zincate to inhibit the chemical attack of the hydroxide on the electrodes. The invention also contemplates means for utilizing the solid electrolyte with closely spaced electrodes, the means being effective in producing a cell of low internal resistance.

Figure 1:
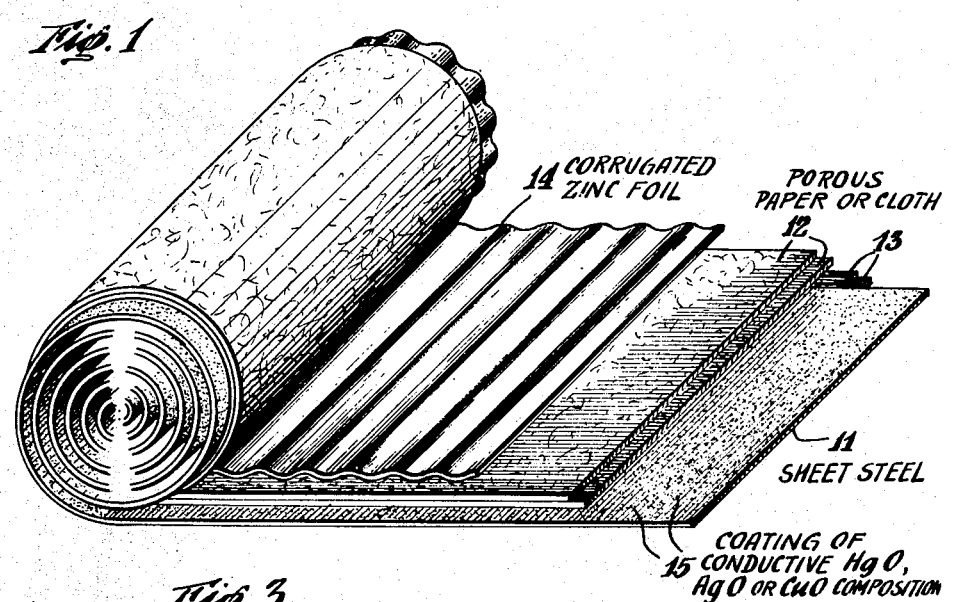
Figure 1 is a perspective view of the electrodes and spacers of a primary cell during assembly.
Figure 2:
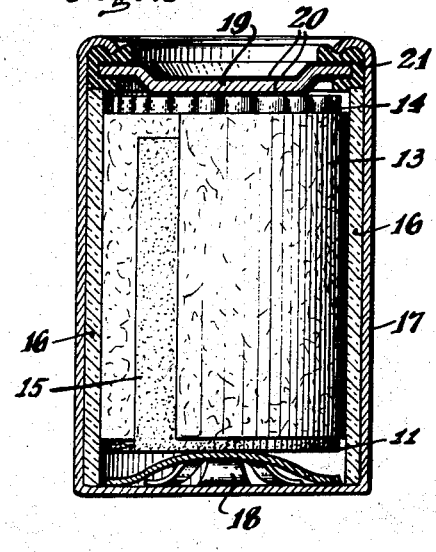
Figure 2 is a section through the completed primary cell.

Referring to Figures 1 and 2, which illustrate one construction of the dry cell of the invention, the electrodes and spacers may be assembled in the manner shown in Figure 1. A thin strip of sheet steel 11 is coated on both sides with the depolarizer composition 15. Two strips of porous absorbent material 12, such as porous paper, nylon cloth, cotton cloth or felted fibres, are laid on one side of the coated steel strip and two other strips 13 of similar porous material are placed on the opposite side of the steel strip. A strip of corrugated zinc foil 14 is then laid against the sheets 12 and the entire assembly is wound into a roll wherein the coated steel sheet is separated from the zinc foil by double layers of porous sheet material. The zinc foil and steel strip are arranged in staggered or offset fashion so that one edge of the steel strip projects at the bottom end of the roll and one edge of the zinc strip projects at the top end of the roll.

In place of steel strip, I may use nickel plated copper foil as the base to which the depolarizer is applied. The copper foil, which should be plated after it has been slit in order to avoid exposed copper edges, has the advantage of being soft and easy to wind.

Depolarizer coating 15 is a bonded conductive composition containing an electrolytically-reducible oxygen yielding compound, preferably an oxide, such as mercuric oxide, silver oxide or cupric oxide. In order to give the composition good electrical conductivity a certain proportion of a conductive material, such as graphite, is preferably added. The finely-divided materials are intimately mixed or milled together and combined with a binder dissolved in a volatile solvent. This suspension is spread onto the steel strip with a brush or spreading implement, or is sprayed thereon.

A suitable mercuric oxide depolarizer composition, which is the preferred mixture for most applications, is formed of:

| | Per cent |
|---|---|
| Mercuric oxide | 90 |
| Graphite | 10 |

This is mixed with a 10% solution of polymerized vinyl chloride in a solvent, such as a ketone. Sufficient solution is used to render the suspension of the desired consistency for spreading or spraying.

A representative copper oxide composition may contain:

| | Per cent |
|---|---|
| Cupric oxide | 92 |
| Graphite | 8 |

Where silver oxide is used, no graphite is required.

In all of these compositions the proportions of graphite may be varied rather widely, but generally within the range between 0.1 and 10.0% by weight. However, in some cases, particularly with silver oxide, the composition may have sufficient conductivity for the intended use without the addition of any graphite or other separate conductive ingredient. The main function of the graphite is to prevent the binder from insulating the oxide particles from each other.

Steel sheet 11 may suitably be formed of steel 2 mils thick. A preferred thickness for the coating is about 2.75 mils on each side of the steel backing. After drying, the coating is baked at a temperature of 130° C. for ½ hour. The coating is then preferably densified by rolling the strip between steel rollers such as those used for rolling metal stock. This increases the density and conductivity of the coating, giving it a smooth uniform surface. The rolling is done at a relatively high temperature, such as around 125° C.

Another method of producing a copper oxide electrode comprises oxidizing a copper or copper-plated foil to form a cupric oxide surface layer, this oxidized foil being used instead of the coated steel foil.

The zinc foil strip 14 is preferably formed of 5 mil foil which has been corrugated with about 16 corrugations to the inch, the corrugations being about 2 mils deep.

The porous spacer sheets 12 and 13 are formed of any porous sheet insulating material which is not seriously attacked by the alkaline electrolyte. The preferred material is the porous felted cotton fibre paper, known as Feltril paper. Sheets about 10 mils thick are suitable. Other porous paper of high purity cellulose stock, such as filter paper and Dexter paper are also suitable, as are muslin cloth, nylon cloth, glass cloth and the like. If highly porous spacers are used, such as open mesh nylon cloth, corrugation of the zinc may not be necessary.

After the roll is wound as illustrated in Figure 1 it is inserted in a sleeve 16 (Figure 2) of alkali-resistant plastic, such as polystyrene, polyethylene, neoprene or ethylcellulose, the material dependent on the impregnation temperature used. It is then impregnated with the alkaline electrolyte heated to liquifying temperature (100 to 130° C. dependent upon the electrolyte or H₂O content) and the zinc electrode is amalgamated at the same time.

The electrolyte may be formed by dissolving from 200 to 400 grams of C. P. potassium hydroxide (containing 12 to 14% water) in 100 milliliters of water and reacting therewith a substantial quantity of zinc oxide to form by reaction a content of potassium zincate. About 16 grams of zinc oxide per 100 grams of C. P. potassium hydroxide is preferred, and generally it is desirable to use sufficient zinc oxide to introduce between 10 and 20 grams of combined zinc into the electrolyte for each 100 grams of KOH used. The zinc oxide reacts with some of the KOH to produce potassium zincate, believed to have the formula $K_2ZnO_2$, so that the original KOH concentration of 57 to 70% is correspondingly reduced.

Electrolytes formed from above 175 grams of C. P. potassium hydroxide per 100 ml. of water and reacted with zinc oxide will solidify when cooled to room temperature. These might in some cases be used but to obtain the optimum of shelf life it is essential that the melting point of the solid electrolyte exceed the maximum ambient temperature that the cell is expected to encounter. For non-tropical use the melting point should exceed 50° C. and preferably be higher, and for tropical use it should be much higher, for example above 80° C. In any event the electrolyte will contain at least 28% water, and usually within the range of 28 to 44% water.

I have made a satisfactory electrolyte by adding 75 grams C. P. potassium hydroxide (containing 88% KOH) to 25 milliliters of water, adding 12 grams of zinc oxide, stirring and heating to 180 to 190° centigrade to obtain a clear solution.

and allowing it to cool to about 120° C. before impregnating.

Since amalgamated zinc is rather brittle, the zinc anode 14 is amalgamated after winding. While it may be amalgamated in any suitable manner, it is preferable to combine the amalgamation step with the impregnation of the electrode assembly with electrolyte. One method is to dust the spacer sheets 12 and 13 which come in contact with the zinc anode with mercuric oxide powder before winding. When the assemblies have been wound they are immersed in the heated liquified electrolyte. The mercuric oxide becomes reduced to mercury which spreads over the zinc and readily amalgamates with it. Another method is to add a mercurial salt such as mercuric cyanide to the electrolyte.

Another method comprises placing the rolls, zinc end upwards, in a tray and placing droplets of mercury on the projecting edge of the zinc foil at distributed points. The liquified electrolyte is then poured into the tray from which it is drawn up into the rolls. The mercury readily spreads over the wet zinc surface. Sufficient mercury should be used to produce a 5 to 20% amalgam. This latter method is more applicable to the lower melting point electrolytes.

During impregnation the spacers 12 and 13 may swell into the spaces provided by the corrugations in the anode. The liquified electrolyte fills all air spaces in the roll and saturates the spacers. If desired, alternate vacuum and pressure may be applied while the rolls are immersed in the electrolyte to draw out all air bubbles.

After impregnation the rolls are removed and allowed to cool to solidify the electrolyte in the rolls. Excess solid electrolyte is scraped off the ends of each roll to expose the projecting electrode edges and the roll is inserted in a steel container 17 (Figure 2). A spring steel spider 18 is first placed in the bottom of the container to insure continuous pressure contact with the edge of steel cathode sheet 11.

The cell top comprises dished copper disc 19 plated on both sides with a silver coating 20. The silver is preferably amalgamated, or becomes amalgamated by contact with the amalgamated zinc anode. A grooved circular grommet 21 of deformable insulating material such as rubber, neoprene, polyethylene or butyl rubber is fitted over the edge of the top disc and the disc is inserted in position with the central area of the disc in contact with the projecting edge of the zinc anode and the grommet 21 resting on the top edge of insulating sleeve 16. The free edge of can 17 is then turned or spun in over the grommet to apply pressure thereto and seal the cell.

According to a modification of procedure the roll is inserted in the can before impregnation with electrolyte and the can is filled with molten electrolyte. Vacuum is applied to remove gas bubbles, then the top is placed on the cell and sealing is completed either before or after cooling below solidifying temperature.

Due to the close spacing of the electrodes and the short electrolytic current path of large area thus provided, the cell has a comparatively low internal resistance at ordinary temperatures and good current capacity. The cell has an open circuit potential with mercuric oxide as depolarizer of 1.343 volts, it has 1.58 volts with silver oxide and 1.03 volts with copper oxide.

The zincate content of the electrolyte reduces the chemical attack on the zinc to a negligible value during impregnation with the highly reactive hot molten electrolyte as well as during the subsequent life of the cell. Due to the high content of zincate in the immobilized electrolyte, whereby it is or quickly becomes saturated at the anode surface, the zinc hydroxide produced in operation, due to the anode reaction, is deposited as a layer on the anode.

The electrolyte is completely immobilized in its solidified state and provides an effective barrier against the migration of deleterious cathode products, such as copper compounds, mercury, graphite particles, impurities and the like away from the cathode.

Figure 3:
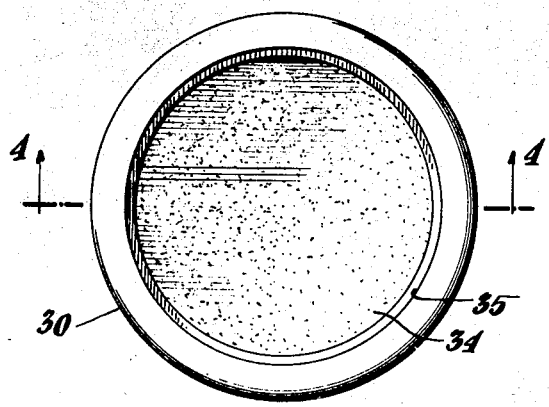
Figure 3 is a top view of a cell of modified construction.
Figure 4:
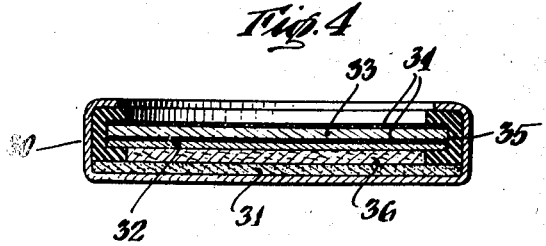
Figure 4 is a section on the line 4—4 of Figure 3.

Figures 3 and 4 show a cell of modified construction suitable for applications where a potential source is required with small or negligible current delivery. This cell comprises a steel cup 30 having a layer 31 of conductive depolarizing composition pressed in the bottom. This may be one of the mixtures of oxide and graphite previously described, without the addition of the binder. The anode assembly consists of an amalgamated zinc disc 32 in direct contact with copper top disc 33 having a silver coating 34 which has been amalgamated. The assembled discs are encircled and held together by a grooved grommet ring 35. The spacer comprises a disc 36 of porous paper or cloth which just fits within grommet 35.

The spacer disc is immersed in the molten electrolyte and then is laid against the amalgamated zinc anode surface within the grommet. This assembly is then placed in container 30 so that the spacer comes in contact with the surface of cathode 31. The edge of the cup 30 is turned over the grommet to complete and seal the cell.

Sodium and lithium hydroxides have some limited utility for solid electrolytes either singly or in mixtures with potassium hydroxide, the solutions in any event being given a zincate content to reduce local attack on the zinc anode. Sodium hydroxide solutions containing above 120 grams of C. P. sodium hydroxide (having about 13% water) to 100 ml. of water will solidify when cooled.

However, potassium hydroxide yields an electrolyte of much lower specific resistivity, develops a much higher load voltage and has a better shelf life.

While specific embodiments of the invention have been described it is intended to cover the invention broadly within the spirit and scope of the appended claims.

What is claimed is:

1. A primary cell comprising, in combination, a pair of electrodes and a solid crystallized alkaline electrolyte between said electrodes and in contact therewith, said electrolyte containing as its essential constituent a solidified aqueous alkali metal hydroxide solution and at least 28% water of hydration to render said electrolyte operative for ionic conduction.

2. A primary cell comprising, in combination, a pair of closely spaced electrodes, a porous spacer therebetween, and a solid crystalline alkaline electrolyte impregnating said spacer and in contact with said electrodes, said electrolyte containing as its essential constituent a solidified aqueous alkali metal hydroxide solution and water of hydration in amount sufficient to render said electrolyte operative for ionic conduction.

3. A primary cell comprising, in combination, an amalgamated zinc anode and a coherent conductive cathode comprising an electrolytically-reducible oxygen yielding compound, and a solid electrolyte between said anode and cathode and in contact therewith, said electrolyte comprising a solidified aqueous alkali metal hydroxide solution containing water of hydration and a substantial quantity of alkali metal zincate.

4. A primary cell comprising, in combination, an amalgamated zinc anode and a coherent conductive cathode comprising an electrolytically-reducible oxygen yielding compound, said anode and cathode being closely spaced and having a porous sheet spacer therebetween, and a solidified aqueous alkali metal hydroxide electrolyte containing water of hydration impregnating said spacer and in contact with said electrodes.

5. A primary cell comprising, in combination, an amalgamated zinc anode and a coherent conductive cathode comprising an electrolytically-reducible oxygen yielding compound, said anode and cathode being closely spaced and having a porous sheet spacer therebetween, and a solidified aqueous alkali metal hydroxide electrolyte impregnating said spacer and in contact with said electrodes, said electrolyte containing water of hydration and a substantial proportion of alkali metal zincate.

6. A primary cell comprising, in combination, an amalgamated zinc anode layer, a cathode layer in closely spaced face to face relation with said zinc layer and comprising an electrolytically-reducible oxygen yielding compound, a porous spacer between said layers and a solidified electrolyte impregnating said spacer, said electrolyte being the solidification product of an aqueous solution of an alkali metal hydroxide containing water of hydration and a substantial proportion of alkali metal zincate.

7. A primary cell comprising, in combination an amalgamated zinc anode layer, a cathode layer in closely spaced face to face relation with said zinc layer and comprising an electrolytically-reducible oxygen yielding compound, a porous spacer between said layers and a solidified electrolyte impregnating said spacer, said electrolyte being the solidification product of an aqueous solution of potassium hydroxide containing 28 to 44 percent of water of hydration and a substantial quantity of potassium zincate.

8. A primary cell comprising, in combination, an amalgamated zinc anode layer, a cathode layer in closely spaced face to face relation with said zinc layer and comprising an electrolytically-reducible oxygen yielding compound, a porous spacer between said layers and a solidified electrolyte impregnating said spacer, said electrolyte being the solidification product of an aqueous solution of potassium hydroxide containing 28 to 44 percent of water of hydration and potassium zincate in proportions equivalent to those resulting from reacting 10 to 20 grams of zinc with each 100 grams of KOH used.

9. A primary cell comprising, in combination, an amalgamated zinc sheet anode, a cathode comprising a metal sheet having a coherent conductive composition bonded to the surface thereof, said composition including an electrolytically-reducible oxygen yielding compound of a metal, a porous sheet spacer interposed therebetween and a solidified electrolyte impregnating said spacer, said electrolyte being the solidification product of a concentrated aqueous solution of potassium hydroxide containing water of hydration and a substantial proportion of potassium zincate.

10. A primary cell comprising, in combination, an amalgamated zinc sheet anode, a cathode comprising a metal sheet having a coherent conductive composition bonded to the surface thereof, said composition including an electrolytically-reducible oxygen yielding compound of a metal, a porous sheet spacer interposed therebetween and a solidified electrolyte impregnating said spacer, said electrolyte being the solidification product of a concentrated aqueous solution of potassium hydroxide containing water of hydration and a substantial proportion of postassium zincate, one of said electrodes being corrugated.

11. A primary cell comprising, in combination, an amalgamated zinc anode, a coherent conductive cathode closely spaced to said anode and comprising an oxide selected from the group consisting of mercuric oxide, cupric oxide and silver oxide, a porous spacer between said anode and cathode and a solidified electrolyte impregnating said spacer, said electrolyte being the solidification product of a concentrated aqueous solution of potassium hydroxide containing water of hydration and a substantial proportion of potassium zincate.

12. A primary cell comprising, in combination, an amalgamated zinc sheet anode, a cathode comprising a nickel plated copper base sheet having a coherent conductive composition bonded to the surface thereof, said composition including an electrolytically-reducible oxygen yielding compound of a metal, a porous spacer interposed therebetween and a solidified electrolyte impregnating said spacer, said electrolyte being the solidification product of a concentrated aqueous solution of potassium hydroxide containing water of hydration and a substantial proportion of potassium zincate.

13. A primary cell comprising, in combination, an amalgamated zinc anode, a coherent conductive cathode comprising an electrolytically-reducible oxygen yielding compound, and a body of solid electrolyte between said anode and cathode and in contact therewith, said electrolyte comprising a solidified aqueous potassium hydroxide solution containing water of hydration in amount sufficient to render said electrolyte operative for ionic conduction.

14. A primary cell comprising, in combination, an amalgamated zinc anode, a coherent conductive cathode comprising cupric oxide, and a body of solid electrolyte between said anode and cathode and in contact therewith, said electrolyte comprising a solidified aqueous alkali metal hydroxide solution containing water of hydration in amount sufficient to render said electrolyte operative for ionic conduction.

SAMUEL RUBEN.

REFERENCES CITED

The following references are of record in the file of this patent:

UNITED STATES PATENTS

| Number | Name | Date |
|---|---|---|
| 856,162 | Kitsee | June 4, 1907 |
| 937,730 | Wedekind et al. | Oct. 19, 1909 |
| 1,011,485 | Pfleiderer | Dec. 12, 1911 |
| 1,137,226 | Manchester | Apr. 27, 1915 |
| 1,863,791 | Heise | June 21, 1932 |
| 2,422,045 | Ruben | June 10, 1947 |